Patented Mar. 19, 1935

1,994,731

UNITED STATES PATENT OFFICE 1,994,731

ACCELERATOR

Lorin B. Sebrell, Silver Lake, and Albert M. Clifford, Stow, Ohio, assignors to Wingfoot Corporation, Wilmington, Del., a corporation of Delaware No Drawing. Application February 25, 1932, Serial No. 595,218

28 Claims. (Cl. 18—53)

Our invention pertains to the vulcanization of rubber.

It is well known that the mercaptothiazoles generally, and particularly mercaptobenzothiazole act as powerful accelerators of vulcanization when incorporated in rubber and subjected to heat and pressure. The dithiazyl monosulfides derived therefrom, as for example, dibenzothiazyl monosulfide, are occasionally used instead, largely because they are free from the tendency of the mercaptothiazoles to scorch the stocks in which they are employed. They are, however, slower than and therefore inferior to the mercaptothiazoles as accelerators of vulcanization.

One of the objects of our invention is to increase the somewhat limited usefulness as accelerators of those and other dithiazyl monosulfides.

Among other things, our invention involves the discovery that a basic nitrogen compound such as ammonia, an amine or a Schiff's base, added to the rubber mix either together with the desired dithiazyl monosulfide or separately, has the effect of enhancing the accelerative power of the dithiazyl monosulfide without detracting from the ability of the latter to accelerate vulcanization without scorching the stock. Mixtures of these nitrogen compounds with the dithiazyl monosulfides constitute accelerators of great power. They do not cause premature vulcanization at the temperatures involved in the milling steps, but when subjected to the proper degree of heat bring about active vulcanization.

Dibenzothiazyl monosulfide, which is illustrative of the dithiazyl monosulfides generally in the practice of our invention, may be represented as follows:

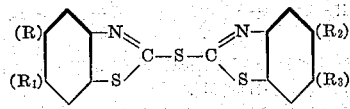

In this formula, the characters R, R1, R2 and R3 indicate the position of possible substituents, the same replacing hydrogens present in the unsubstituted compound. Obviously, the number and nature of the substituents, if any, will depend on the reagents employed in the preparation of the monosulfide. Thus the unsubstituted monosulfide can be obtained by reacting a 2-chlor benzothiazole and a benzothiazyl sulphide; substituted monosulfides, by employing a substituted chlor benzothiazole and/or a substituted benzothiazyl sulphide. The substituents R, R1, R2 and R3 may be similar or dissimilar radicals selected from a group including nitro, amino, phenyl, ethyl, methyl, bromine, chlorine and other radicals.

Examples of organic bases which may be employed to activate the dithiazyl monosulfides are diphenylguanidine, triphenyl guanidine, diortho tolyl guanidine, dicyclo hexyl guanidine, hexamethylene tetramine, dicyclo hexyl piperazine, piperazine, piperidine, ethylene diamine, the polyethylene diamines, allyl amine, propyl amine, heptyl amine, benzyl amine, isoamyl amine, dibutyl amine, phenyl ethyl amine, methyl cyclo hexyl amine, alpha carbo diphenyl di-imid and amino ethyl alcohol. Schiff's bases, which may be employed with satisfactory results, include crotonylidene aniline, butylidene aniline, aldol aniline, ethylidene aniline, methylene aniline, methylene toluidine and methylene xylidene. Formaldehyde, acetaldehyde and other aldehyde derivatives of Schiff's bases are also suitable; likewise, the bases formed by the interaction of aliphatic amines such as ethyl amine, ethylene diamine, propyl amine, and similar amines with such aldehydes as acetaldehyde, propionaldehyde, butyraldehyde, crotonaldehyde and the aldols. In mixtures of the dithiazyl monosulfides with these organic bases, it is preferable to use from 10 to 60 percent of organic base.

The compounds may be mixed prior to incorporating them in the rubber mix or they may be milled separately into the rubber. In either case, they may be employed in standard rubber formulae. The following is an illustrative example of a formula in which they have been found by actual test to be satisfactory:

| | Parts |
|---|---|
| Rubber | 100 |
| Zinc oxide | 5 |
| Sulfur | 3 |
| Stearic acid | 1.5 |
| Accelerator | .5 |

In this formula, the relative proportions of the two compounds may vary over a wide range, although 40 percent of the dithiazyl monosulfide is to be preferred. For testing the efficacy of the accelerator, samples of rubber prepared in accordance with the above formula were subjected to vulcanization for varying periods of time. The samples were then subjected to physical tests in order to ascertain the tensile strength and elasticity thereof. Results of these tests are tabulated as follows:

| Cure | | Tens. strength kgs/cm² | Elong. percent | Stress kgs/cm² at— | |
|---|---|---|---|---|---|
| Time in mins. | Temp. °F. | | | 500% elong. | 700% elong. |
| 40% 6-mono nitro dibenzothiazyl monosulfide 60% crotonylidene aniline | | | | | |
| 20 | 260 | 100 | 925 | 10 | 31 |
| 40 | 260 | 160 | 805 | 23 | 87 |
| 80 | 260 | 198 | 745 | 37 | 151 |
| 60 | 285 | 176 | 755 | 33 | 128 |
| 40% 6-mono nitro dibenzothiazyl monosulfide 60% diphenylguanidine | | | | | |
| 20 | 260 | 25 | 920 | 5 | 10 |
| 40 | 260 | 153 | 825 | 20 | 75 |
| 80 | 260 | 206 | 725 | 44 | 183 |
| 60 | 285 | 194 | 695 | 50 | |
| 40% 6-nitro 5-chloro dibenzothiazyl monosulfide 60% diphenylguanidine | | | | | |
| 20 | 260 | 100 | 940 | 10 | 28 |
| 40 | 260 | 160 | 750 | 30 | 120 |
| 80 | 260 | 220 | 700 | 54 | 220 |
| 60 | 285 | 216 | 715 | 53 | 205 |
| 40% 6-6' dinitro 5-chlor dibenzothiazyl monosulfide 60% diphenylguanidine | | | | | |
| 20 | 260 | 102 | 945 | 11 | 28 |
| 40 | 260 | 144 | 745 | 28 | 110 |
| 80 | 260 | 221 | 715 | 50 | 205 |
| 60 | 285 | 208 | 710 | 50 | 198 |
| 40% 6-nitro 5'-chlor dibenzothiazyl monosulfide 60% crotonylidene aniline | | | | | |
| 20 | 260 | 114 | 875 | 15 | 46 |
| 40 | 260 | 164 | 775 | 30 | 114 |
| 80 | 260 | 200 | 725 | 45 | 175 |
| 60 | 285 | 180 | 725 | 41 | 155 |
| 40% 6-6' dinitro 5-chloro dibenzothiazyl monosulfide 60% crotonylidene aniline | | | | | |
| 20 | 260 | 106 | 725 | 15 | 42 |
| 40 | 260 | 154 | 885 | 25 | 90 |
| 80 | 260 | 185 | 800 | 35 | 132 |
| 60 | 285 | 167 | 755 | 40 | 140 |

Obviously, the dithiazyl monosulfide and the organic base herein employed conjointly as the accelerator may be manufactured without the use of complicated or expensive apparatus. The materials are in most cases solids which do not tend to scorch the stock and which may be introduced into rubber compounds without excessive milling. Their use gives rise to products of good tensile strength and elasticity. In view of these facts and of the absence of any noticeable toxicity, these compounds are highly desirable as commercial accelerators.

The above examples of the practice of the invention are to be regarded as illustrations only, for it will be understood that various changes may be made by persons skilled in the art without departing from the spirit of the invention. It is desired to embrace such modifications and changes as may be necessary to adapt to varying conditions and uses. It is intended that the patent shall cover, by suitable expression in the appended claims, whatever features of patentable novelty reside in the invention herein disclosed.

What we claim is:

1. A method of treating rubber which comprises vulcanizing it in the presence of a di(aryl thiazyl) monosulfide and an accelerating amine.

2. A method of treating rubber which comprises subjecting it to vulcanization in the presence of a di(benzo thiazyl) monosulfide and an accelerating organic base.

3. A method of treating rubber which comprises subjecting it to vulcanization in the presence of a di(aryl thiazyl) monosulfide and a basic nitrogen-containing compound.

4. A method of treating rubber which comprises subjecting it to vulcanization in the presence of a di(aryl thiazyl) monosulfide and a Schiff's base.

5. A method of treating rubber which comprises subjecting it to vulcanization in the presence of a mixture of a dibenzenoid thiazyl monosulfide and an organic base.

6. A method of treating rubber which comprises subjecting it to vulcanization in the presence of a nitro-di(aryl thiazyl) monosulfide and an amine.

7. A method of treating rubber which comprises subjecting it to vulcanization in the presence of a di(aryl thiazyl) monosulfide and crotonylidene aniline.

8. A method of treating rubber which comprises subjecting it to vulcanization in the presence of a di(aryl thiazyl) monosulfide and a poly aryl guanidine.

9. A method of treating rubber which comprises subjecting it to vulcanization in the presence of a di(aryl thiazyl) monosulfide and a poly phenyl guanidine.

10. A method of treating rubber which comprises subjecting it to vulcanization in the presence of a mixture of a di(aryl thiazyl) mono sulfide and diphenylguanidine.

11. A rubber product that has been vulcanized in the presence of di(benzo thiazyl) mono sulfide and an accelerating organic base.

12. A rubber product that has been vulcanized in the presence of di(benzo thiazyl) mono sulfide and an accelerating organic base.

13. A rubber product that has been vulcanized in the presence of a di(aryl thiazyl) mono sulfide and a basic nitrogen-containing compound.

14. A vulcanizable rubber composition comprising, in combination, a rubber stock containing a mixture of a di(aryl thiazyl) mono sulfide and an accelerating organic base.

15. A rubber product that has been vulcanized in the presence of an accelerating organic base and a nitro dibenzothiazyl monosulfide.

16. The process of treating rubber which comprises combining said rubber with a vulcanizing agent and a small proportion of a nitro benzothiazyl monosulfide admixed with a complementary organic accelerator of basic nature.

17. A rubber product that has been vulcanized in the presence of a 6—6' dinitro dibenzothiazyl monosulfide and a poly-aryl guanidine.

18. The process of treating rubber which comprises vulcanizing in the presence of an accelerating organic base and a compound having the formula

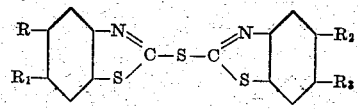

wherein at least one of the R groups is a substituent replacing hydrogen.

19. A vulcanizable rubber composition comprising, in combination, a rubber stock containing a dibenzothiazyl monosulfide and an aldehyde-amine accelerator.

20. The process of treating rubber which comprises vulcanizing it in the presence of a mono nitro dibenzothiazyl monosulfide and a Schiff's base.

21. The process of treating rubber which comprises vulcanizing in the presence of a nitro di (benzothiazyl) mono sulfide and a basic organic nitrogen-containing compound.

22. The process of treating rubber which comprises vulcanizing in the presence of di(benzothiazyl) mono sulfide and a diaryl guanidine.

23. The process of treating rubber which comprises vulcanizing in the presence of di (benzothiazyl) mono sulfide and a basic organic nitrogen-containing compound.

24. The process of treating rubber which comprises vulcanizing in the presence of a chlor di (benzothiazyl) mono sulfide and a basic organic nitrogen-containing compound.

25. A rubber product which has been vulcanized in the presence of a nitro di (benzothiazyl) mono sulphide and a basic organic nitrogen-containing compound.

26. A rubber product which has been vulcanized in the presence of di (benzothiazyl) mono sulfide and a diaryl guanidine.

27. A rubber product which has been vulcanized in the presence of di (benzothiazyl) mono sulphide and a basic organic nitrogen-containing compound.

28. A rubber product which has been vulcanized in the presence of a di (aryl thiazyl) mono sulphide and an accelerating amine.

LORIN B. SEBRELL.
ALBERT M. CLIFFORD.